US008260927B2

(12) United States Patent
Coronado et al.

(10) Patent No.: US 8,260,927 B2
(45) Date of Patent: Sep. 4, 2012

(54) MANAGEMENT OF A RESERVE FOREVER DEVICE

(75) Inventors: Juan Alonso Coronado, Tucson, AZ (US); Russell Bernard Krueger, Tucson, AZ (US); Christina Ann Lara, Tucson, AZ (US); Beth Ann Peterson, Tucson, AZ (US); Xavier Edgar Somoza, Tucson, AZ (US); Aaron Eugene Taylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 844 days.

(21) Appl. No.: 12/358,170

(22) Filed: Jan. 22, 2009

(65) Prior Publication Data

US 2010/0185744 A1  Jul. 22, 2010

(51) Int. Cl.
*H04L 29/06* (2006.01)

(52) U.S. Cl. .................. 709/226; 711/162; 711/167

(58) Field of Classification Search .......... 711/162, 711/167; 709/226
See application file for complete search history.

(56) References Cited

U.S. PATENT DOCUMENTS

| | | | |
|---|---|---|---|
| 6,304,980 B1 * | 10/2001 | Beardsley et al. | 711/162 |
| 6,480,953 B1 | 11/2002 | Hughes | |
| 6,526,492 B1 | 2/2003 | McBrearty et al. | |
| 6,804,703 B1 | 10/2004 | Allen et al. | |
| 6,842,832 B1 | 1/2005 | Franaszek et al. | |
| 7,206,875 B2 | 4/2007 | Marushak et al. | |
| 7,277,952 B2 | 10/2007 | Nishanov et al. | |
| 7,308,600 B2 | 12/2007 | Dubal et al. | |
| 2005/0044281 A1 * | 2/2005 | McCarthy | 710/5 |

OTHER PUBLICATIONS

Behman, S.B., "Unconditional Reserve", IBM TDB 07-76, Jul. 1, 1976, pp. 689-690.
Iskiyan, J.L., R.D. Tennison, J.M. Waddell, and D.E. Whitmer, "Reserving Logical Address Spaces", IBM TDB 06-75, Jun. 1, 1975, pp. 55-58.

* cited by examiner

*Primary Examiner* — Jeffrey Pwu
*Assistant Examiner* — Thong Truong
(74) *Attorney, Agent, or Firm* — Rabindranath Dutta; Konrad Raynes & Victor LLP

(57) ABSTRACT

A host reserves a device controlled by a controller that is coupled to the host. The controller starts a first timer, in response to a completion of input/output (I/O) operations on the device by the host, wherein the host continues to reserve the device after the completion of the I/O operations. The controller sends a notification to the host after an expiry of the first timer, wherein the notification requests the host to determine whether the device should continue to be reserved by the host. The controller starts a second timer, in response to receiving an acknowledgement from the host that the notification has been received by the host, wherein reservation status of the device reserved by the host is determined by the controller on or prior to an expiry of the second timer.

20 Claims, 8 Drawing Sheets

MANAGEMENT OF A RESERVE FOREVER DEVICE

BACKGROUND

1. Field

The disclosure relates to a method, system, and article of manufacture for the management of a reserve forever device.

2. Background

A plurality of hosts may share a plurality of storage volumes that store data. A controller may control access to the plurality of storage volumes, and the plurality of hosts may access the plurality of storage volumes via the controller. The storage volumes may also be referred to as volumes or devices.

A host may reserve a volume to prevent other hosts from accessing and modifying critical data within the volume. Once a volume is reserved, a relatively small subset of commands may be run by other hosts to the reserved volume. However, any host that wants to run the full set of commands may have to wait until the volume is released. Once the reserving host completes critical I/O operations to the reserved volume, the reserving host may release the reserved volume and any waiting hosts may then run all commands to the volume and/or may reserve the volume for themselves.

SUMMARY OF THE DESCRIBED EMBODIMENTS

Provided are a method, system, and article of manufacture, wherein a host reserves a device controlled by a controller that is coupled to the host. The controller starts a first timer, in response to a completion of input/output (I/O) operations on the device by the host, wherein the host continues to reserve the device after the completion of the I/O operations. The controller sends a notification to the host after an expiry of the first timer, wherein the notification requests the host to determine whether the device should continue to be reserved by the host. The controller starts a second timer, in response to receiving an acknowledgement from the host that the notification has been received by the host, wherein reservation status of the device reserved by the host is determined by the controller on or prior to an expiry of the second timer.

In additional embodiments, the host releases the reserved device, in response to the notification received by the host from the controller, prior to the expiry of the second timer.

In yet additional embodiments, the controller determines that the second timer has expired and the device is still reserved by the host. The controller broadcasts to other hosts coupled to the controller that the device is reserved.

In further embodiments, the host sends a command to the controller, wherein the command indicates to the controller an action that the host will take to release the device. The controller stops the second timer, in response to receiving the command from the host.

In yet further embodiments, the controller is a storage controller and the device is a storage device that includes at least one storage volume. The I/O operations are allowed to be performed exclusively on the at least one storage volume to the host that has reserved the storage device, wherein all other hosts have to wait for performing the I/O operations on the at least one storage volume until the storage device is no longer reserved, and wherein other hosts are able to perform other operations except the I/O operations on the at least one storage volume. The first timer is a device reserve timer maintained in the storage controller, and the second timer is a broadcast reserve timer maintained in the storage controller.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

It is possible for a volume to be reserved forever by a host. A reservation of a volume may be "forgotten" as a result of failures in hardware or software occurring at the controller, the host, or both at the host and the controller. When the volume is stuck in reserve, other hosts may not be able to run commands with respect to the volume. As a result, certain I/O commands may time out and fail. In certain situations the host may try the failed command again and again until the number of retries is exhausted.

Certain embodiments use a proactive mechanism to inform the host that has the device reserved for itself. In certain embodiments, when a host completes I/O to a device, the host indicates the completion of the I/O command chain with an end of chain command or similar command such as a selective reset that may indicate the termination of the I/O due to an error condition. If the controller determines that the host has the device reserved, the controller may start a timer referred to as a device reserve timer. If the device reserve timer expires and the device has not been released, the controller may send a notification to the host that indicates that the host has the device reserved.

The host may display an operator message upon receiving the notification. In certain embodiments, the host may take an immediate action, and send a release command to the controller. In certain other embodiments, the host may wait for the system operator to perform certain actions.

When the device reserve timer expires, a second timer referred to as a broadcast reserve time may be started by the controller. The broadcast reserve timer may continue to tick until the host releases the device, the broadcast reserve timer expires, or the host holding the reserve indicates to the controller the actions the hosts wants to be performed. The host may indicate the desired controller behavior to the controller by encoding the host's release device action in a new command sent to the controller.

When the broadcast reserve timer expires, the controller may broadcast to all the other hosts, excluding the host holding the device reserved, a notification that a device is reserved. The notified hosts may therefore avoid performing unnecessary operations on the reserved device.

Exemplary Embodiments

Figure 1:
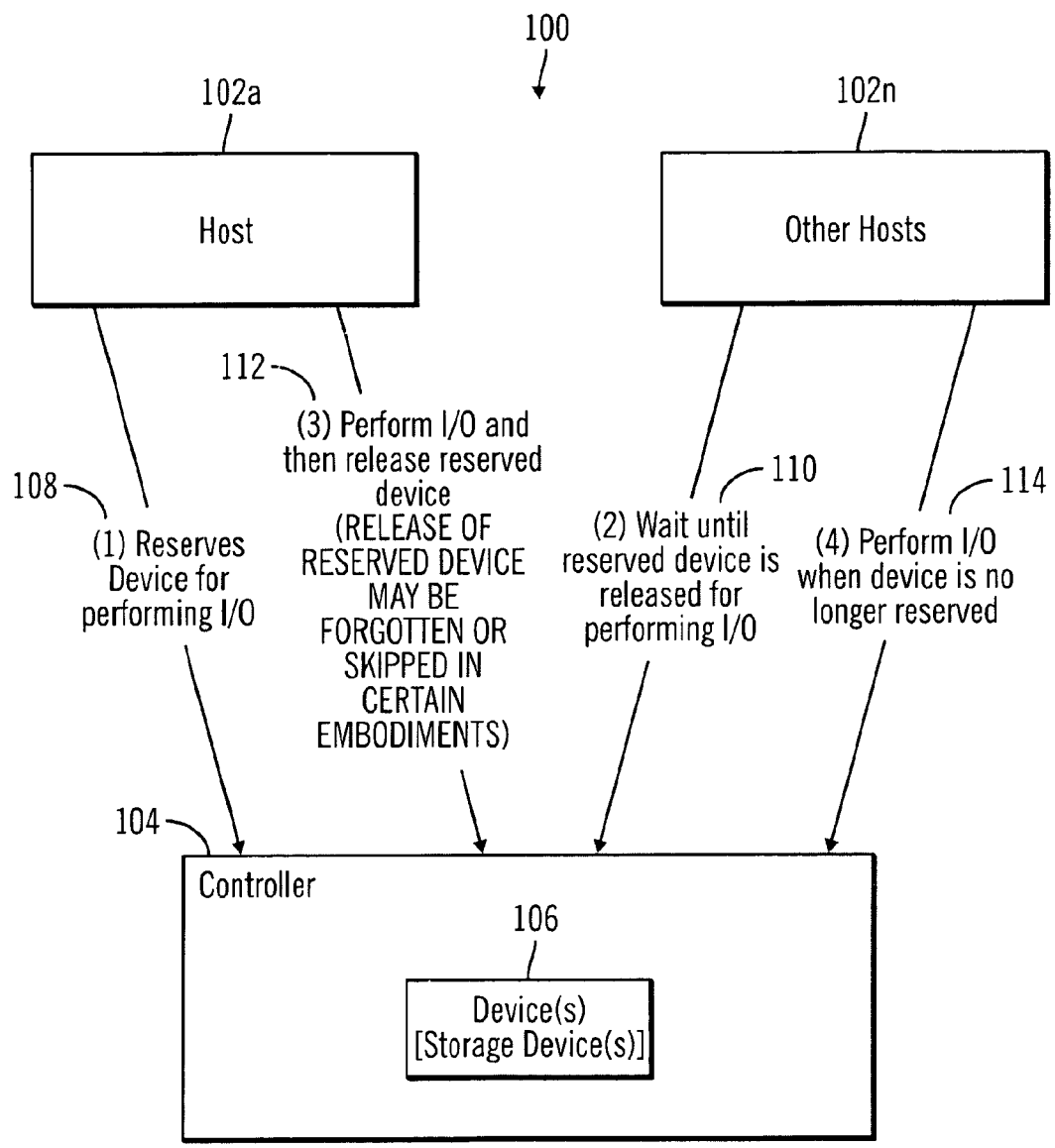
FIG. 1 illustrates a block diagram of a computing environment in accordance with certain embodiments.

FIG. 1 illustrates a block diagram of a computing environment 100 in accordance with certain embodiments. A plurality of hosts 102a, 102n are coupled to a controller 104 that controls access to one or more storage devices 106. The plurality of hosts 102a, 102n and the controller 104 may comprise any suitable computational device, such as, a personal computer, a workstation, a server, a mainframe, a hand held computer, a palm top computer, a telephony device, a network appliance, a blade computer, a storage server, etc. The plurality of storage devices 106 may include any suitable physical or logical storage device known in the art, such as, a tape drive, a disk drive, a storage volume, etc.

The host 102a may reserve the device 106 for performing I/O operations (reference numeral 108). The other hosts 102n except for the reserving host 102a may wait until the reserved device 106 is released for performing I/O operations (reference numeral 110). The host 102a may complete I/O operations and then release the reserved device 106, although in certain embodiments the release of the reserved device 106 may be forgotten or skipped by the host 102a (reference numeral 112). The other hosts 102n except for host 102a may perform I/O operations on the device 106 when the device 106 is no longer reserved (reference numeral 114).

It is possible for device 106 to be reserved forever by the host 102a. A reservation by the host 102a may be "forgotten" as a result of failures in hardware or software occurring at the controller 104, the host 102a, or both at the host 102a and the controller 104. When the device 106 is stuck in reserve, the other hosts 102n cannot run I/O commands on the device 106.

Figure 2:
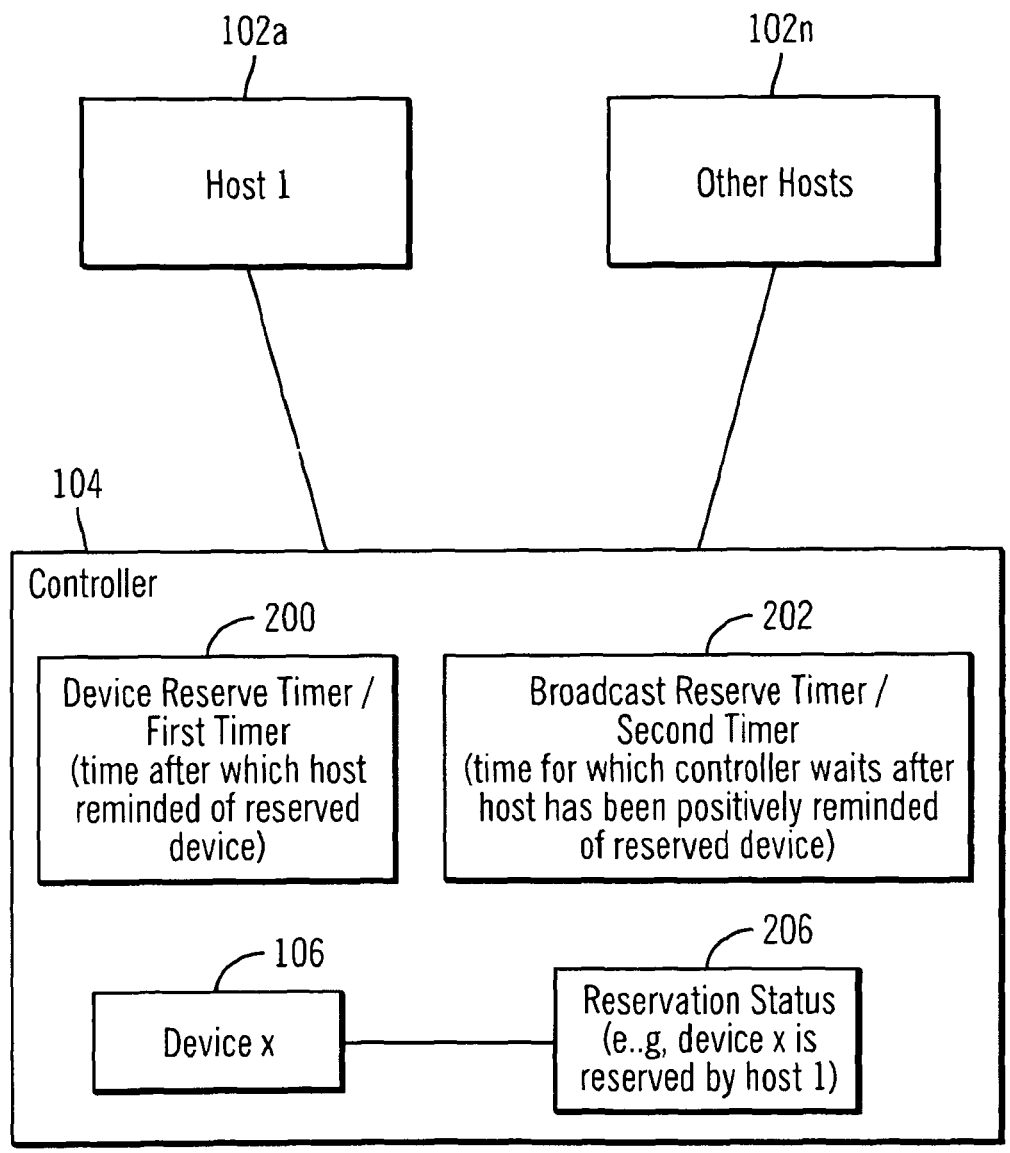
FIG. 2 illustrates a block diagram that shows elements within a controller coupled to a plurality of hosts, in accordance with certain embodiments.

FIG. 2 illustrates a block diagram that shows elements within the controller 104 coupled to the plurality of hosts 102a, 102n, in accordance with certain embodiments. In FIG. 2 the host 102a is also referred to as host 1.

The controller 104 includes data structures corresponding to a first timer 200 (also referred to as a device reserve timer 200), a second time 202 (also referred to as a broadcast reserve timer 202), the device 106, and reservation status 206 of the device 106, wherein device 106 may also be referred to as device x.

The device reserve timer 200 indicates the time after which a reserving host is reminded by the controller 104 that the reserving host has continued to maintain reservation on a device. The broadcast reserve timer 202 indicates the time for which the controller 104 waits after the reserving host has been positively reminded of a reserved device. The exemplary reservation status 206 indicates that device 106 has been reserved by the host 102a.

Figure 3:
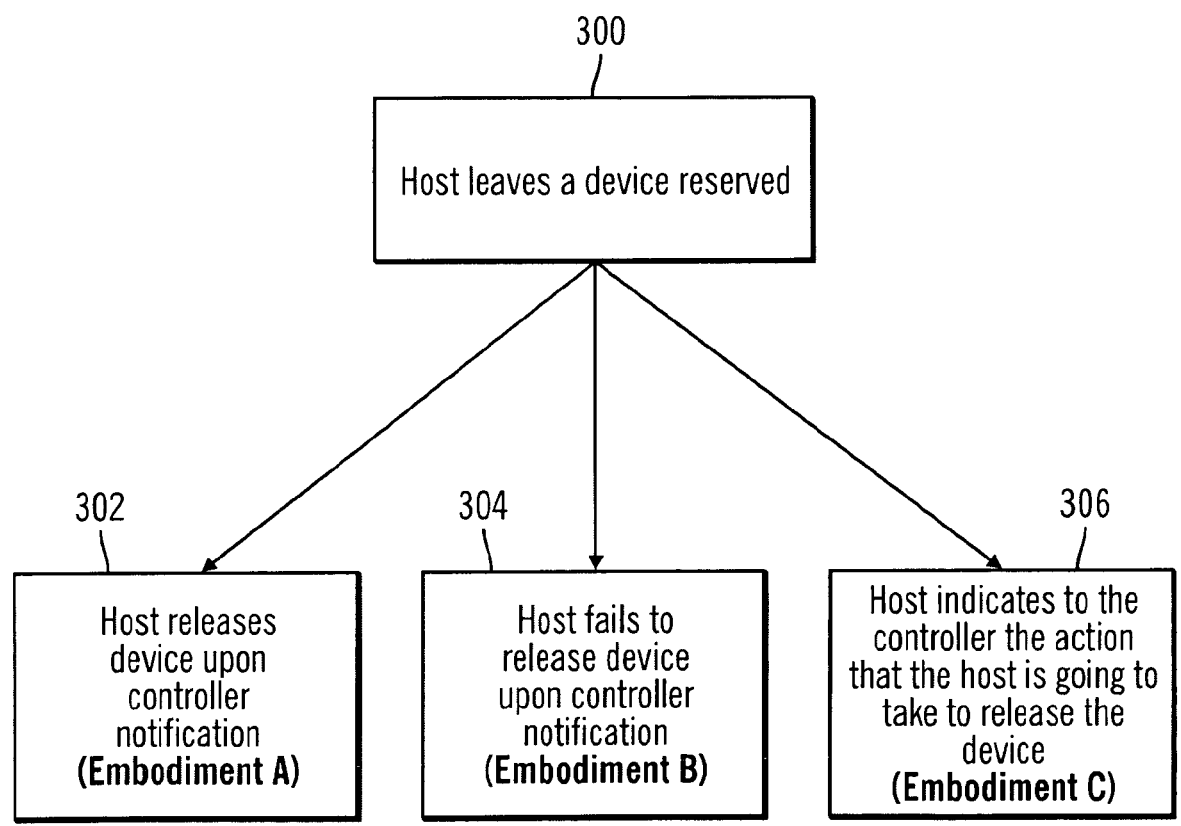
FIG. 3 illustrates a block diagram that shows operations that take place after a host has indicated that a device is to be left as reserved, in accordance with certain embodiments.

FIG. 3 illustrates a block diagram that shows operations that take place after a host has indicated that a device is to be left as reserved, in accordance with certain embodiments.

Control starts at block 300 where a host 102a leaves a device 106 as reserved. From block 300 control may proceed to either block 302 or block 304 or block 306. In a first embodiment (embodiment A in FIG. 3), the host 102a releases (at block 302) a device 106 upon notification by the controller 104. In a second embodiment (embodiment B in FIG. 3), the host 102a fails to release the device 106 upon notification by the controller 104. In a third embodiment (embodiment C in FIG. 3), the host 102a indicates to the controller 104 the action that the host 102a is going to take to release the device 106.

Figure 4:
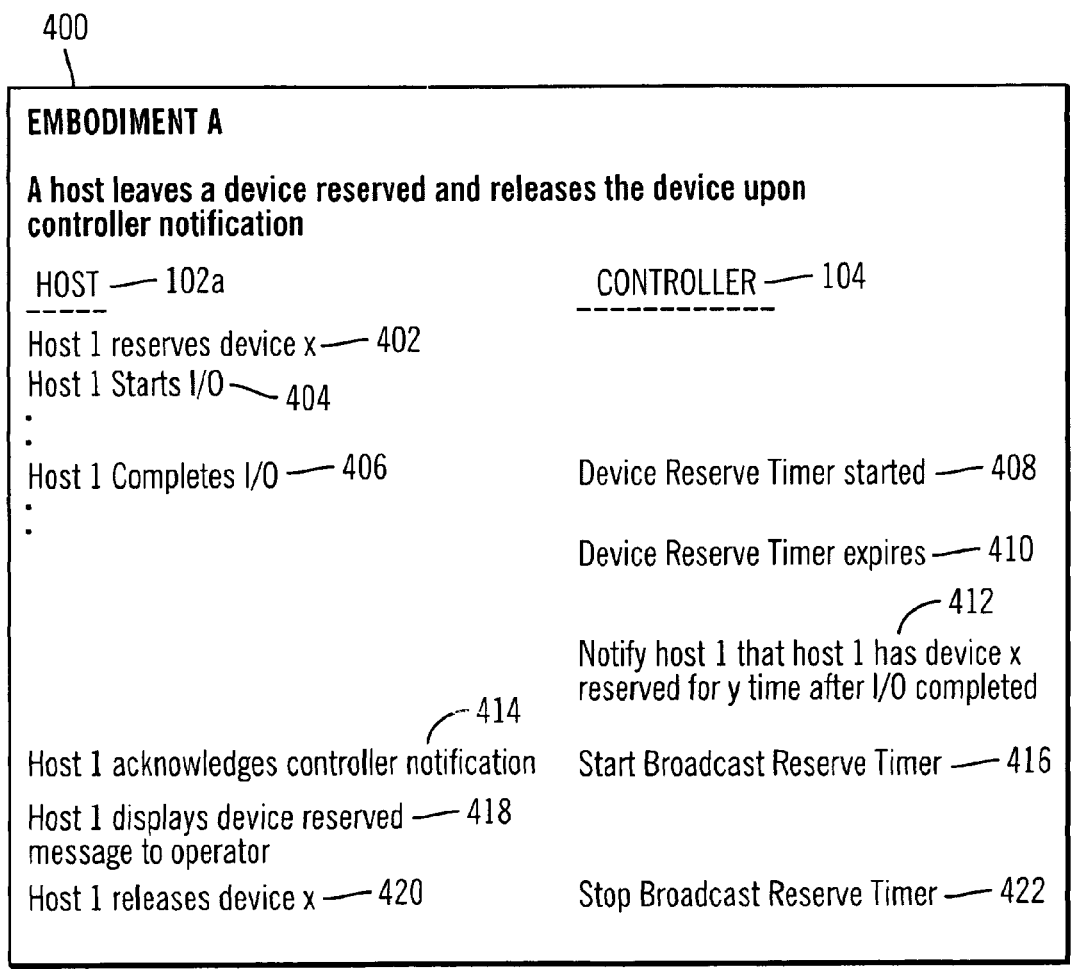
FIG. 4 illustrates a block diagram that shows a first embodiment in which a host releases a device upon notification by the controller, in accordance with certain embodiments.

FIG. 4 illustrates a block diagram that shows a first embodiment 400 (shown as embodiment A in FIG. 4) in which a host 102a releases a device 106 upon notification by the controller 104.

The host 102a reserves a device 106 (reference numeral 402) and then starts I/O operations to the device 106 (reference numeral 404) and after a period of time completes I/O operations to the device 106 (reference numeral 406). When the host 102a completes I/O operations to the device 106, the host 102a indicates the completion of the I/O command chain with an end of chain command or similar command such as a selective reset that indicates the termination of the I/O due to an error condition. If the controller 104 determines that the host 102a has the device 106 reserved, then the controller 104 starts (reference numeral 408) the device reserve timer 200. If the device reserve timer 200 expires (reference numeral 410) and the device 106 has not been released, then the controller 104 sends (reference numeral 412) a notification to the host 102a that the host 102 has the device 106 reserved for a certain amount of time after I/O completion.

The host 102a acknowledges (reference numeral 414) the controller notification and on receiving the acknowledgement from the host 102a the controller 104 starts (reference numeral 416) the broadcast reserve timer 202. Meanwhile, the host 102a displays (reference numeral 418) a device reserved message to an operator and may then release (reference numeral 420) the device 106. In certain embodiments, the host 102a may wait for a response from the operator to take action and in certain other embodiments the host 102a may take an immediate action upon receiving the controller notification.

In response to the release of the device 106, the controller 104 stops (reference numeral 422) the broadcast reserve timer 202.

Figure 5:
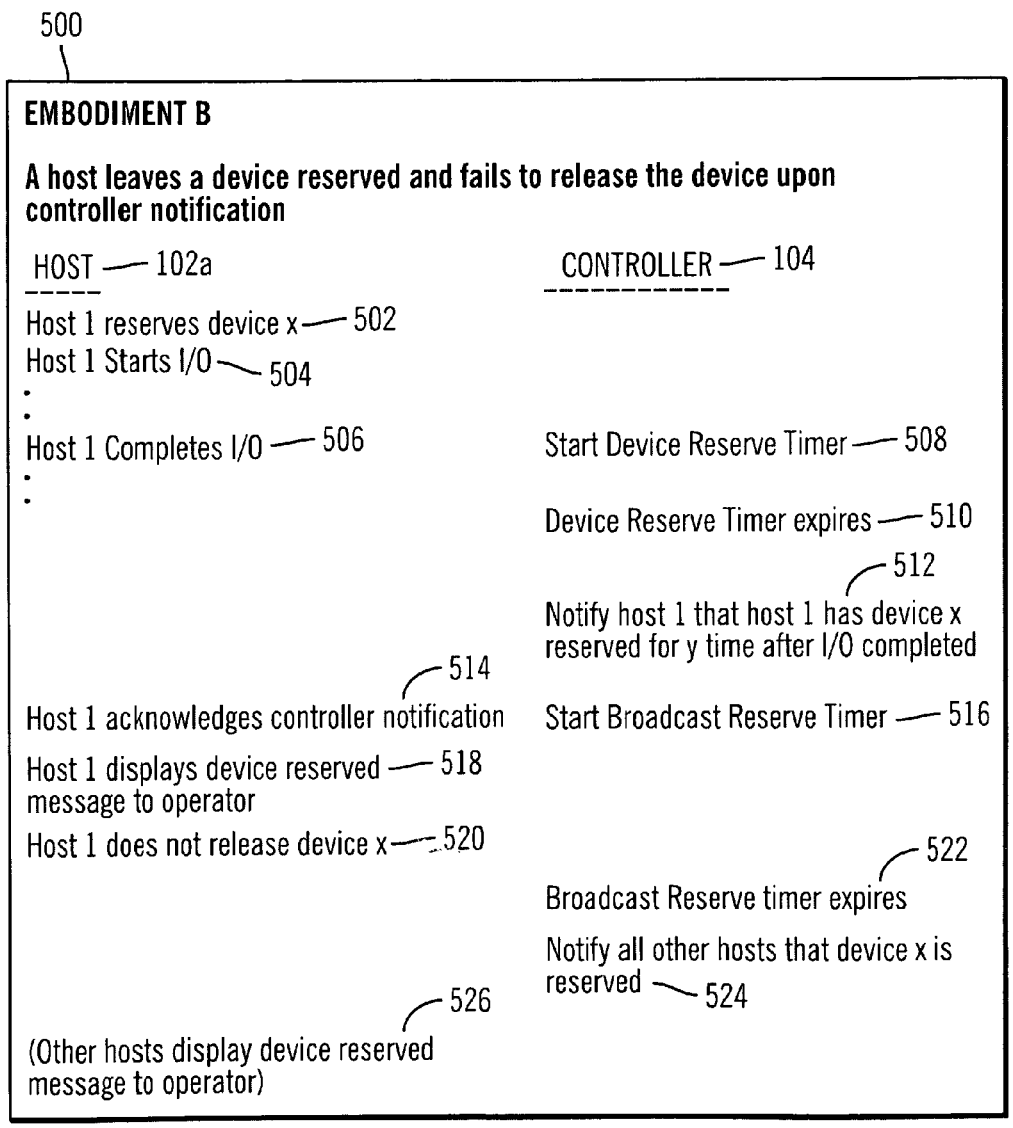
FIG. 5 illustrates a block diagram that shows a second embodiment in which a host fails to release a device upon notification by the controller, in accordance with certain embodiments.

FIG. 5 illustrates a block diagram that shows a second embodiment 500 (shown as embodiment B in FIG. 5) which a host 102a fails to release a device 106 upon notification by the controller 104.

In FIG. 5 the sequence of operations shown by reference numerals 502, 504, 506, 508, 510, 512, 514, 516, 518 are the same as the sequence of operations shown by reference numerals 402, 404, 406, 408, 410, 412, 414, 416, 418 of FIG. 4. However, in FIG. 5 the host 102a does not release (reference numeral 520) the device 106 and the broadcast reserve timer 202 expires (reference numeral 522) in the controller 104. On the expiry of the broadcast reserve timer 202, the controller 104 notifies (reference numeral 524) all other hosts 102n that device 106 is reserved. As a result, the other hosts 102n do not try to perform I/O operations to the device 106. The other hosts 102n may display (reference numeral 526) a device reserved message to operators.

Figure 6:
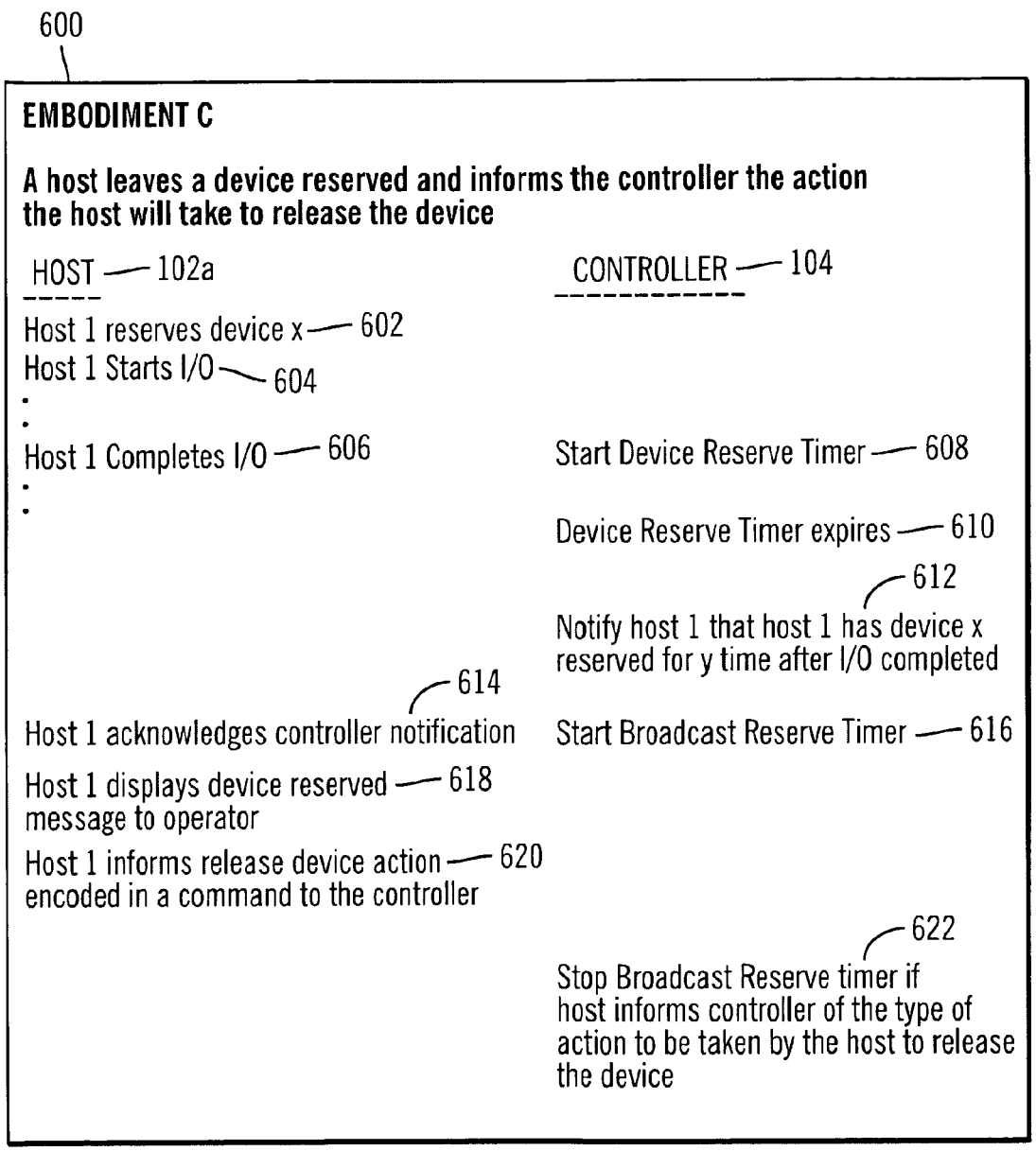
FIG. 6 illustrates a block diagram that shows a third embodiment in which a host indicates to the controller the action that the host is going to take to release the device, in accordance with certain embodiments.

FIG. 6 illustrates a block diagram that shows a third embodiment 600 (shown as embodiment C in FIG. 6) in which a host 102a indicates to the controller 104 the action that the host 102a is going to take to release the device 106.

In FIG. 6 the sequence of operations shown by reference numerals 602, 604, 606, 608, 610, 612, 614, 616, 618 are the same as the sequence of operations shown by reference numerals 402, 404, 406, 408, 410, 412, 414, 416, 418 of FIG. 4. However, in FIG. 6 the host 102a communicates (reference numeral 620) to the controller 104 a command, wherein the command indicates to the controller an action that the host 102a will take to release the device 106. The controller 104 stops (reference numeral 622) the broadcast timer 502, in response to receiving the command from the host.

Figure 7:
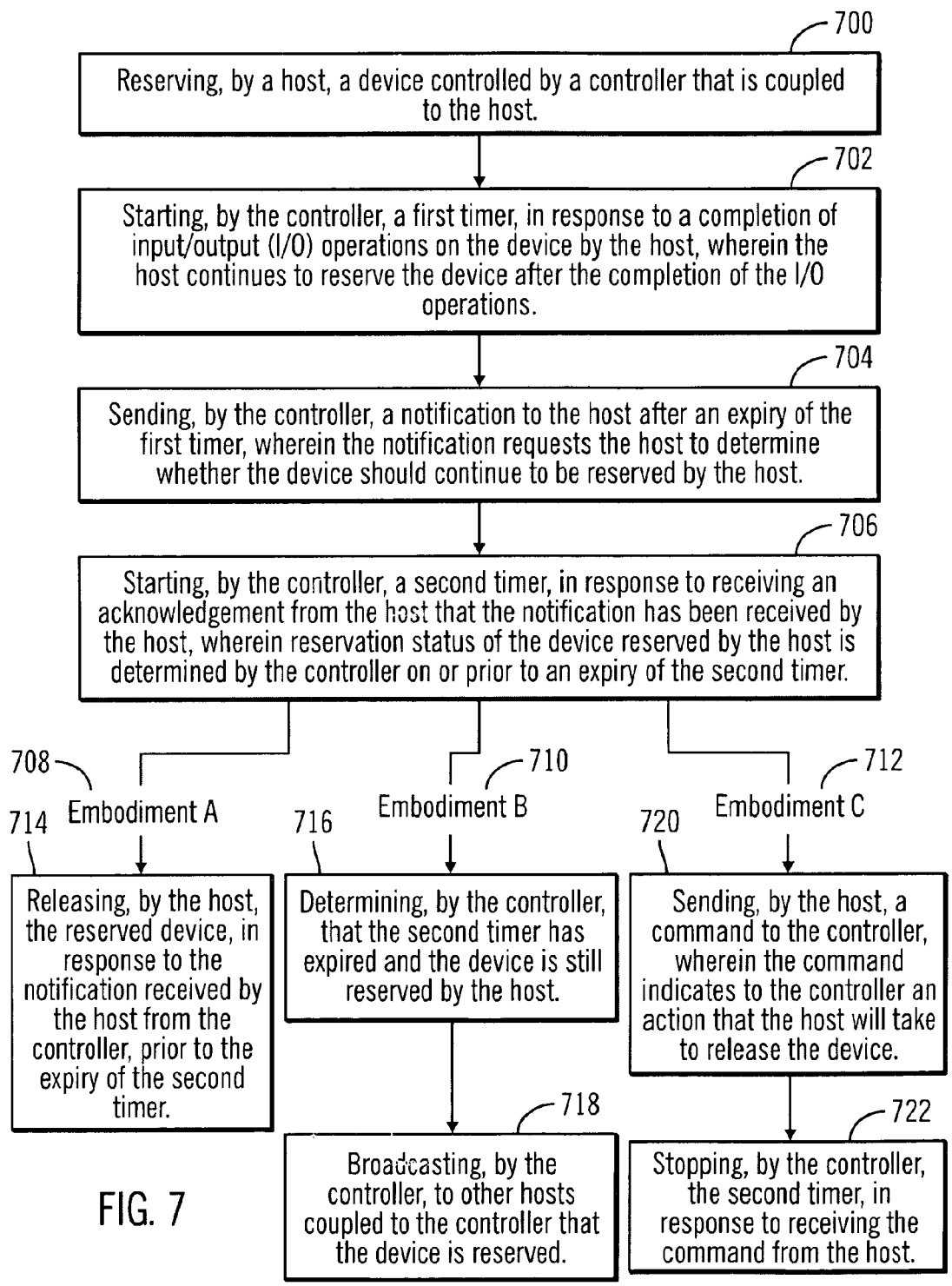
FIG. 7 illustrates exemplary operations performed in the computing environment of FIG. 1, in accordance with certain embodiments.

FIG. 7 illustrates operations performed in the computing environment of FIG. 1, in accordance with certain embodiments. The operations shown in FIG. 7 may be performed by the hosts 102a, 102n and the controller 104 of the computing environment 100.

Control starts at block 700, wherein a host 102a reserves a device 106 controlled by a controller 104 that is coupled to the host 102a. The controller 104 starts (at block 702) a first timer 200, in response to a completion of input/output (I/O) operations on the device 106 by the host 102a, wherein the host 102a continues to reserve the device 106 after the completion of the I/O operations.

The controller 104 sends (at block 704) a notification to the host 102a after an expiry of the first timer 200, wherein the notification requests the host 102a to determine whether the device 106 should continue to be reserved by the host 102a. The controller 104 starts (at block 706) a second timer 202, in response to receiving an acknowledgement from the host 102a that the notification has been received by the host 102a, wherein reservation status 206 of the device 106 reserved by the host 102a is determined by the controller 104 on or prior to an expiry of the second timer 202.

From block 706, operations may continue to be performed in three different embodiments 708, 710, and 712.

In embodiment 708, the host 102a releases (at block 714) the reserved device 106, in response to the notification received by the host 102a from the controller 104, prior to the expiry of the second timer 202.

In embodiment 710, the controller 104 determines (at block 716) that the second timer 202 has expired and the device 106 is still reserved by the host 102a. The controller 104 broadcasts (at block 718) to other hosts 102n coupled to the controller 104 that the device 106 is reserved.

In embodiment 712, the host 102a sends (at block 720) a command to the controller 104, wherein the command indicates to the controller 104 an action that the host 102a will take to release the device 106. The controller 104 stops (at block 722) the second timer, in response to receiving the command from the host 102a.

Therefore, FIGS. 1-7 describe certain embodiments in which by maintaining a device reserve timer and a broadcast reserve timer a controller prevents unnecessary I/O operations from being performed on a reserved device by hosts that have not reserved the device. Additionally, the reserving host is periodically reminded that the reserving host has reserved a device for an extended period of time after completion of I/O operations. Should the reserving host continue to reserve the device beyond the expiry time of the broadcast reserve timer, the controller broadcasts the reserved status of the device to other hosts, and the other hosts avoid I/O operations on the reserved device. By periodically reminding the reserving host of the reservation status of the reserved device, the controller attempts to prevent a reserve "forever" type of situation to occur on a device. Additionally, by broadcasting the reservation status of a device the controller ensures that hosts that have not reserved the device avoid I/O operations on the device.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as, magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 8:
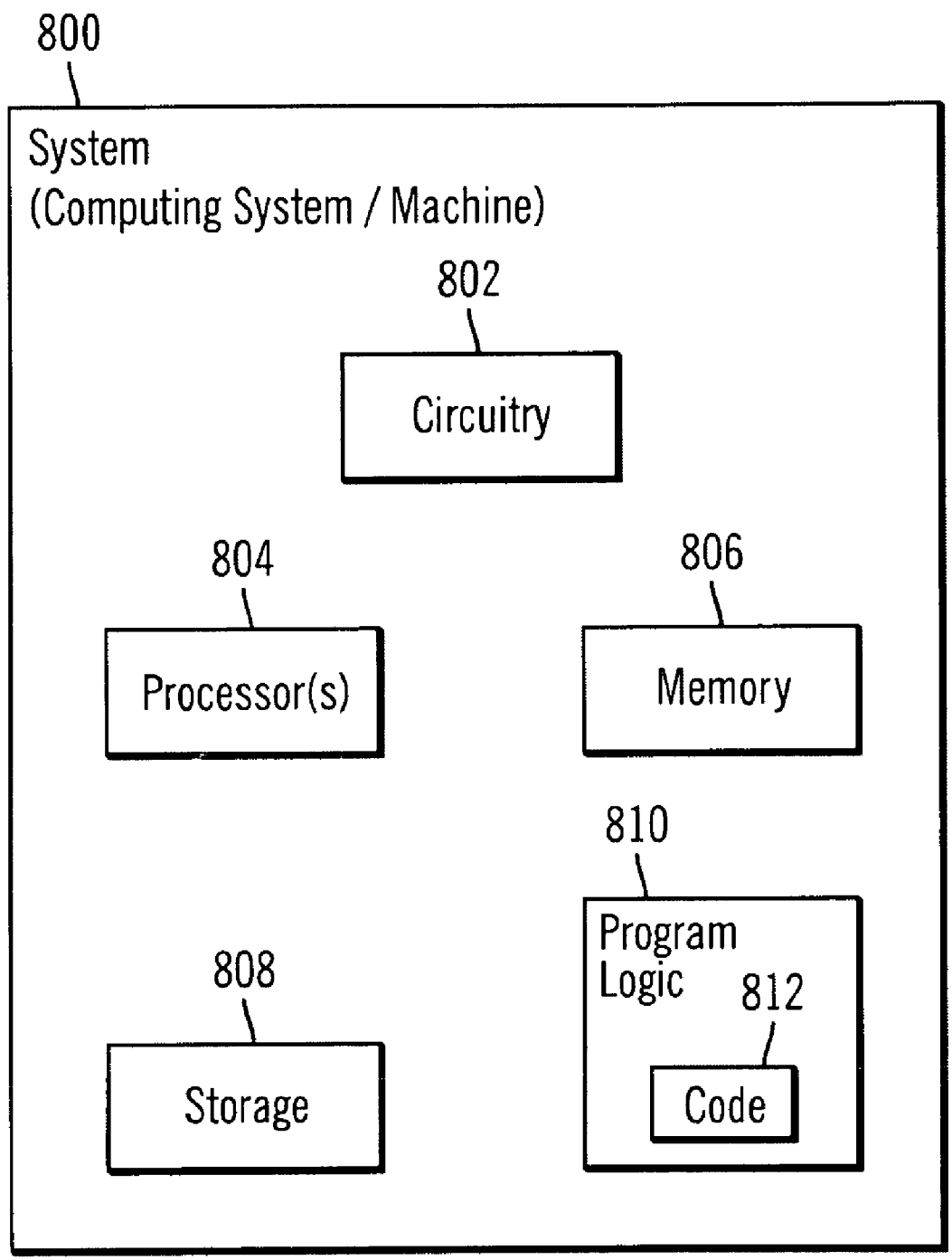
FIG. 8 illustrates the architecture of computing system, wherein in certain embodiments elements of the computing environment of FIG. 1 may be implemented in accordance with the architecture of the computing system.

FIG. 8 illustrates an exemplary computer system 800, wherein in certain embodiments the host 102a, 102n and controller 104 of the computing environment 100 of FIG. 1 may be implemented in accordance with the computer architecture of the computer system 800. The computer system 800 may also be referred to as a system, and may include a circuitry 802 that may in certain embodiments include a processor 804. The system 800 may also include a memory 806 (e.g., a volatile memory device), and storage 808. Certain elements of the system 800 may or may not be found in the hosts 102a, 102n and the controller 104 of FIG. 1. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in the figures may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-8 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
reserving, by a host, a device controlled by a controller that is coupled to the host;
starting, by the controller, a first timer, in response to a completion of input/output (I/O) operations on the device by the host, wherein the host continues to reserve the device after the completion of the I/O operations;
sending, by the controller, a notification to the host after an expiry of the first timer, wherein the notification requests the host to determine whether the device should continue to be reserved by the host;
acknowledging, by the host, the notification from the controller, in response to the sending by the controller of the notification;
starting, by the controller, a second timer, in response to receiving an acknowledgement from the host that the notification has been received by the host;
displaying by the host the notification to an operator;
sending, by the host, a command to the controller, wherein the command indicates to the controller an action that the host will take to release the device, in response to displaying the notification to the operator; and
in response to receiving by the controller, the command that indicates to the controller the action the host will take to release the device, stopping, by the controller, the second timer.

2. The method of claim 1, wherein:
the controller is a storage controller;
the device is a storage device that includes at least one storage volume;
the I/O operations are allowed to be performed exclusively on the at least one storage volume to the host that has reserved the storage device, wherein all other hosts have to wait for performing the I/O operations on the at least one storage volume until the storage device is no longer reserved, and wherein other hosts are able to perform other operations except the I/O operations on the at least one storage volume;

the first timer is a device reserve timer maintained in the storage controller; and the second timer is a broadcast reserve timer maintained in the storage controller; wherein the notification is a first notification, and wherein in response to the broadcast reserve timer expiring, the controller broadcasts to all other hosts, excluding the host that holds the device reserved, a second notification that the device is reserved.

3. The method of claim 1, wherein the host informs the controller of a type of action to be taken by the host to release the device.

4. The method of claim 3, wherein the host waits for the operator to perform an action subsequent to the displaying of the notification to the operator.

5. The method of claim 4, wherein the command sent by the host to the controller encodes a release device action, and wherein the second timer is stopped by the controller without the host having released the device.

6. A system, comprising:
a memory; and
a processor coupled to the memory, wherein the processor performs operations, the operations comprising:
reserving, by a host, a device controlled by a controller that is coupled to the host;
starting, by the controller, a first timer, in response to a completion of input/output (I/O) operations on the device by the host, wherein the host continues to reserve the device after the completion of the I/O operations;
sending, by the controller, a notification to the host after an expiry of the first timer, wherein the notification requests the host to determine whether the device should continue to be reserved by the host;
acknowledging, by the host, the notification from the controller, in response to the sending by the controller of the notification;
starting, by the controller, a second timer, in response to receiving an acknowledgement from the host that the notification has been received by the host displaying by the host the notification to an operator;
sending, by the host, a command to the controller, wherein the command indicates to the controller an action that the host will take to release the device, in response to displaying the notification to the operator; and
in response to receiving by the controller, the command that indicates to the controller the action the host will take to release the device, stopping, by the controller, the second timer.

7. The system of claim 6, wherein:
the controller is a storage controller;
the device is a storage device that includes at least one storage volume;
the I/O operations are allowed to be performed exclusively on the at least one storage volume to the host that has reserved the storage device, wherein all other hosts have to wait for performing the I/O operations on the at least one storage volume until the storage device is no longer reserved, and wherein other hosts are able to perform other operations except the I/O operations on the at least one storage volume;
the first timer is a device reserve timer maintained in the storage controller; and
the second timer is a broadcast reserve timer maintained in the storage controller, wherein the notification is a first notification, and wherein in response to the broadcast reserve timer expiring, the controller broadcasts to all other hosts, excluding the host that holds the device reserved, a second notification that the device is reserved.

8. The system of claim 6, wherein the host informs the controller of a type of action to be taken by the host to release the device.

9. The system of claim 8, wherein the host waits for the operator to perform an action subsequent to the displaying of the notification to the operator.

10. The system of claim 9, wherein the command sent by the host to the controller encodes a release device action, and wherein the second timer is stopped by the controller without the host having released the device.

11. A hardware implemented computer readable storage medium, wherein code stored in the hardware implemented computer readable storage medium when executed by a processor causes operations, the operations comprising:
reserving, by a host, a device controlled by a controller that is coupled to the host;
starting, by the controller, a first timer, in response to a completion of input/output (I/O) operations on the device by the host, wherein the host continues to reserve the device after the completion of the I/O operations;
sending, by the controller, a notification to the host after an expiry of the first timer, wherein the notification requests the host to determine whether the device should continue to be reserved by the host;
acknowledging, by the host, the notification from the controller, in response to the sending by the controller of the notification;
starting, by the controller, a second timer, in response to receiving an acknowledgement from the host that the notification has been received by the host displaying by the host the notification to an operator;
sending, by the host, a command to the controller, wherein the command indicates to the controller an action that the host will take to release the device, in response to displaying the notification to the operator; and
in response to receiving by the controller, the command that indicates to the controller the action the host will take to release the device, stopping, by the controller, the second timer.

12. The hardware implemented computer readable storage medium of claim 11, wherein:
the controller is a storage controller;
the device is a storage device that includes at least one storage volume;
the I/O operations are allowed to be performed exclusively on the at least one storage volume to the host that has reserved the storage device, wherein all other hosts have to wait for performing the I/O operations on the at least one storage volume until the storage device is no longer reserved, and wherein other hosts are able to perform other operations except the I/O operations on the at least one storage volume;
the first timer is a device reserve timer maintained in the storage controller; and
the second timer is a broadcast reserve timer maintained in the storage controller, wherein the notification is a first notification, and wherein in response to the broadcast reserve timer expiring, the controller broadcasts to all other hosts, excluding the host that holds the device reserved, a second notification that the device is reserved.

13. The hardware implemented computer readable storage medium of claim 11, wherein the host informs the controller of a type of action to be taken by the host to release the device.

14. The hardware implemented computer readable storage medium of claim 13, wherein the host waits for the operator to perform an action subsequent to the displaying of the notification to the operator.

15. The hardware implemented computer readable storage medium of claim 14, wherein the command sent by the host to the controller encodes a release device action, and wherein the second timer is stopped by the controller without the host having released the device.

16. A method for deploying computing infrastructure, comprising integrating computer-readable code into a computing system, wherein the computer-readable code in combination with the computing system is capable of performing:
   reserving, by a host, a device controlled by a controller that is coupled to the host;
   starting, by the controller, a first timer, in response to a completion of input/output (I/O) operations on the device by the host, wherein the host continues to reserve the device after the completion of the I/O operations;
   sending, by the controller, a notification to the host after an expiry of the first timer, wherein the notification requests the host to determine whether the device should continue to be reserved by the host;
   acknowledging, by the host, the notification from the controller, in response to the sending by the controller of the notification;
   starting, by the controller, a second timer, in response to receiving an acknowledgement from the host that the notification has been received by the host displaying by the host the notification to an operator;
   sending, by the host, a command to the controller, wherein the command indicates to the controller an action that the host will take to release the device, in response to displaying the notification to the operator; and
   in response to receiving by the controller, the command that indicates to the controller the action the host will take to release the device, stopping, by the controller, the second timer.

17. The method for deploying computing infrastructure of claim 16, wherein:
   the controller is a storage controller;
   the device is a storage device that includes at least one storage volume;
   the I/O operations are allowed to be performed exclusively on the at least one storage volume to the host that has reserved the storage device, wherein all other hosts have to wait for performing the I/O operations on the at least one storage volume until the storage device is no longer reserved, and wherein other hosts are able to perform other operations except the I/O operations on the at least one storage volume;
   the first timer is a device reserve timer maintained in the storage controller; and
   the second timer is a broadcast reserve timer maintained in the storage controller, wherein the notification is a first notification, and wherein in response to the broadcast reserve timer expiring, the controller broadcasts to all other hosts, excluding the host that holds the device reserved, a second notification that the device is reserved.

18. The method for deploying computing infrastructure of claim 16, wherein the host informs the controller of a type of action to be taken by the host to release the device.

19. The method for deploying computing infrastructure of claim 18, wherein the host waits for the operator to perform an action subsequent to the displaying of the notification to the operator.

20. The method for deploying computing infrastructure of claim 19, wherein the command sent by the host to the controller encodes a release device action, and wherein the second timer is stopped by the controller without the host having released the device.

* * * * *